United States Patent
Nogawa

(10) Patent No.: US 9,338,818 B2
(45) Date of Patent: May 10, 2016

(54) WIRELESS COMMUNICATION APPARATUS FOR WIRELESS NETWORK AND COMPUTER READABLE MEDIA

(71) Applicant: Hideki Nogawa, Nagoya (JP)

(72) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/450,160

(22) Filed: Aug. 1, 2014

(65) Prior Publication Data

US 2014/0342765 A1   Nov. 20, 2014

Related U.S. Application Data

(63) Continuation of application No. 13/431,685, filed on Mar. 27, 2012, now Pat. No. 8,892,030.

(30) Foreign Application Priority Data

Jun. 15, 2011   (JP) ................................. 2011-133611

(51) Int. Cl.
*H04B 7/15*   (2006.01)
*H04W 76/06*   (2009.01)
(Continued)

(52) U.S. Cl.
CPC ............ *H04W 76/068* (2013.01); *H04W 84/12* (2013.01); *H04W 84/18* (2013.01); *H04W 84/20* (2013.01)

(58) Field of Classification Search
CPC ...................... H04W 52/0251; H04W 72/1252
USPC .................................. 455/13.1, 11.1, 15, 41.2
See application file for complete search history.

(56) References Cited

U.S. PATENT DOCUMENTS

| 8,391,260 B1* | 3/2013 | Kopikare et al. ............. 370/338 |
| 2002/0032025 A1 | 3/2002 | Maeshima et al. |

(Continued)

FOREIGN PATENT DOCUMENTS

| CN | 101815309 A | 8/2010 |
| JP | 2002-223217 A | 8/2002 |

(Continued)

OTHER PUBLICATIONS

Japan Patent Office, Notice of Reasons for Rejection issued for Japanese Patent Application No. JP 2011-133611, mailed Dec. 2, 2014.

(Continued)

*Primary Examiner* — Tu X Nguyen
(74) *Attorney, Agent, or Firm* — Baker Botts L.L.P.

(57) ABSTRACT

A wireless communication apparatus may operate selectively as a master station or as a remote station in a wireless network. When the apparatus operates as the master station, the apparatus may manage one or more remote devices that operate as remote stations. The apparatus continues operating as the master station until a continuation period elapses when the number of remote devices to be managed is zero. The continuation period begins when the number of remote devices becomes zero. If the number of remote devices becomes one or more before the continuation period elapses, the apparatus continues operating as the master station, even after a lapse of the continuation period. If the number of remote devices remains zero until the continuation period elapses, the apparatus stops operating as the master station after the lapse of the continuation period.

21 Claims, 10 Drawing Sheets

(51) Int. Cl.
*H04W 84/12* (2009.01)
*H04W 84/18* (2009.01)
*H04W 84/20* (2009.01)

(56) References Cited

U.S. PATENT DOCUMENTS

| | | |
|---|---|---|
| 2004/0018848 A1 | 1/2004 | Ogino et al. |
| 2006/0079182 A1 | 4/2006 | Matsuda |
| 2007/0173270 A1 | 7/2007 | Block et al. |
| 2009/0258596 A1 | 10/2009 | Naik et al. |
| 2010/0046468 A1 | 2/2010 | Oi et al. |
| 2011/0007723 A1 | 1/2011 | Shichino |
| 2011/0195660 A1 | 8/2011 | Okada |
| 2011/0235522 A1 | 9/2011 | Matoba |

FOREIGN PATENT DOCUMENTS

| | | |
|---|---|---|
| JP | 2007-142971 A | 6/2007 |
| JP | 2009-071738 A | 4/2009 |
| JP | 2009-225061 A | 10/2009 |
| JP | 2011-524101 A | 8/2011 |
| WO | 2005-034434 A1 | 4/2005 |

OTHER PUBLICATIONS

State Intellectual Property Office of the People's Republic of China, Notification of First Office Action for Chinese Patent Application No. 201210091005.0, mailed Jul. 25, 2014.
Wi-Fi Alliance Technical Committee P2P Task Group; Wi-Fi Peer-to Peer (P2P) Technical Specification, Version 1.1, 2010.
Wi-Fi Certified Wi-Fi Direct, Wi-Fi Alliance, Oct. 1, 2010, pp. 1-14, Retrieved from the Internet: URL:http://www.wi-fi.org/knowledge-center/white-papers/wi-fi-certified-wi-fi-direct%E2%84%A2-personal-portable-wi-fi%C2%AE-connect-devices [retrieved on Oct. 16, 2012].
European Patent Office, extended European Search Report for European Patent Application No. 12161555.3, dated Nov. 5, 2012.
Japan Patent Office; Notification of Reasons for Rejection for Japanese Patent Application No. 2011-133611, mailed Jun. 2, 2015.

\* cited by examiner

Fig.7
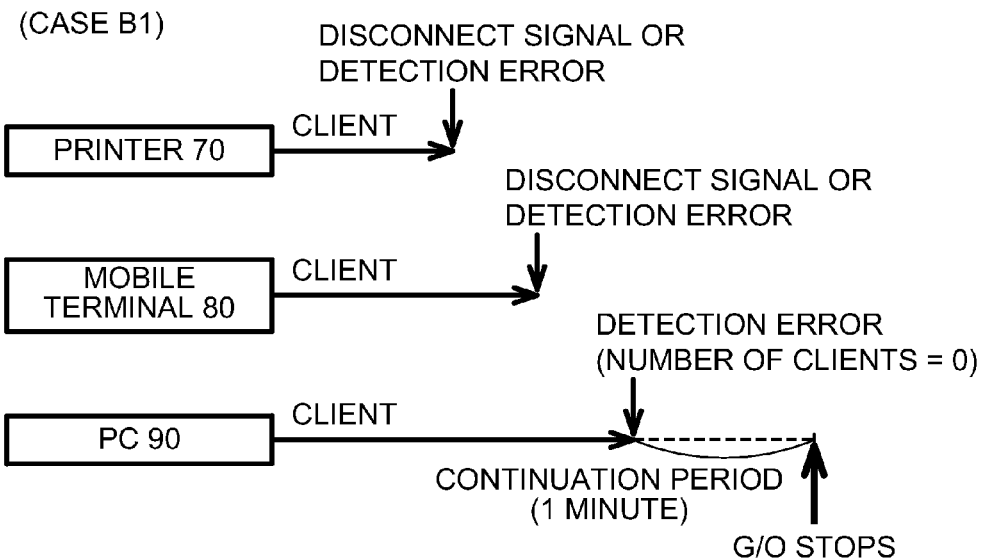
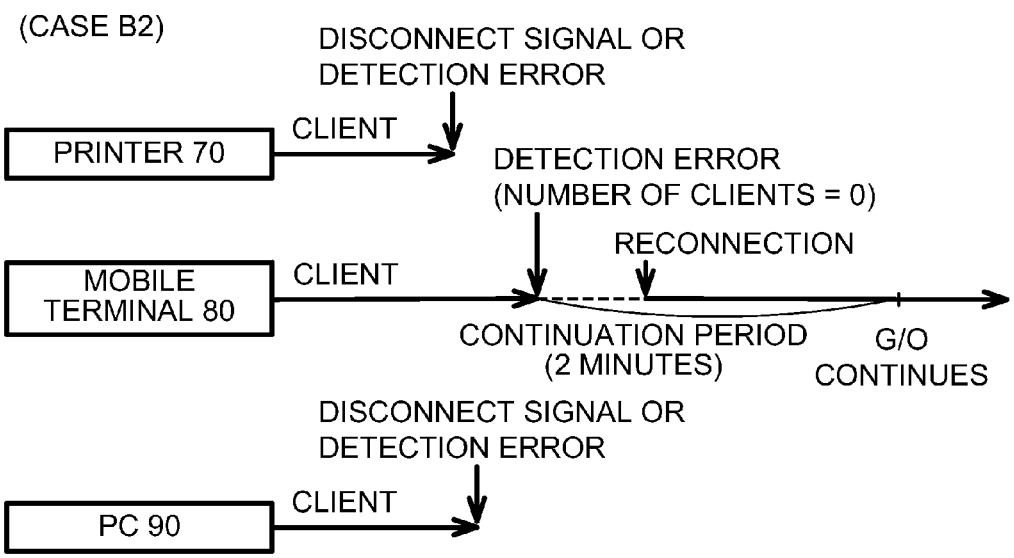

WIRELESS COMMUNICATION APPARATUS FOR WIRELESS NETWORK AND COMPUTER READABLE MEDIA

CROSS-REFERENCE TO RELATED APPLICATION

The present application is a continuation of U.S. patent application Ser. No. 13/431,685, filed on Mar. 27, 2012, which claims the benefit of Japanese Patent Application No. 2011-133611, filed on Jun. 15, 2011, the disclosures of each of which are incorporated herein by reference in their entirety.

BACKGROUND OF THE INVENTION

1. Field of the Invention

The present invention relates generally to wireless communication apparatus capable of selectively operating as a master station or as a remote station in a wireless network and to non-transitory computer readable media providing instructions for such wireless communication apparatus.

2. Description of Related Art

"Wi-Fi Peer-to-Peer (P2P) Technical Specification Version 1.1" (Wi-Fi Alliance, 2010) describes Wi-Fi Direct protocols (hereinafter referred to as "WFD") designed by Wi-Fi Alliance. A wireless network according to WFD may comprise a single device (hereinafter referred to as the "G/O device") that operates as a group owner and one or more devices (hereinafter referred to as the "client device(s)") that operate as clients managed by the G/O device. In the protocols disclosed in "Wi-Fi Peer-to-Peer (P2P) Technical Specification Version 1.1," the G/O device immediately stops operating as a G/O when the number of client devices managed thereby becomes zero. As a result, the wireless network may be immediately lost. In such a case, for example, the wireless network needs to be constructed again immediately after being lost.

The above-described problem applies not only to an apparatus according to WFD, but also to other communication apparatus, each capable of selectively operating as a master station or as a remote station.

SUMMARY OF THE INVENTION

According to embodiments of the present invention, a master device operating as a master station in a wireless network may execute operations as the master station. A wireless communication apparatus configured to operate selectively as a master station or as a remote station in a wireless network may comprise: a processor configured to operate as: a management unit configured to manage one or more remote devices that operate as remote stations in a particular wireless network, when the wireless communication apparatus operates as the master station in the particular wireless network; and an operation control unit configured to continue the operation of the wireless communication apparatus as the master station, when the wireless communication apparatus operates as the master station in the particular wireless network, until a continuation period elapses when the number of remote devices to be managed is zero. The continuation period may begin at the time when the number of remote devices to be managed becomes zero. If the number of remote devices to be managed increases to one or more before the continuation period elapses, the operation control unit may continue the operation of the wireless communication apparatus as the master station in the particular wireless network, even after a lapse of the continuation period. If the number of remote devices to be managed remains zero until the continuation period elapses, the operation control unit may stop the operation of the wireless communication apparatus as the master station after the lapse of the continuation period.

According to other embodiments of the present invention, the wireless communication apparatus may not stop operating as a master station immediately, even if the number of remote devices becomes zero (e.g., operation as the master station may continue during a continuation period). If the number of remote devices becomes one or more before the continuation period elapses, the wireless communication apparatus may continue operating as a master station, even after the lapse of the continuation period. If the number of remote devices remains zero until the continuation period elapses, the wireless communication apparatus may stop operating as a master station after the lapse of the continuation period. In other words, the wireless communication apparatus may either continue or stop operating as a master station in accordance with whether or not the number of remote devices becomes one or more before the continuation period elapses. Therefore, the wireless communication apparatus may execute operations as a master station. As a result, for example, the wireless network need not be constructed again immediately after being lost.

According to still other embodiments of the invention, a non-transitory, computer-readable storage medium may comprise computer-readable instructions for a processor of a wireless communication apparatus configured to operate selectively as a master station or as a remote station in a wireless network. The computer-readable instructions may instruct the processor to perform the steps of: managing one or more remote devices that operate as remote stations in the particular wireless network, when the wireless communication apparatus operates as the master station in a particular wireless network; and controlling the operation of the wireless communication apparatus to continue as the master station, when the wireless communication apparatus operates as the master station in the particular wireless network, until a continuation period elapses when the number of remote devices to be managed is zero. The continuation period may begin at a time when the number of remote devices to be managed becomes zero. The controlling step may comprise continuing the operation of the wireless communication apparatus as the master station in the particular wireless network, even after a lapse of the continuation period, if the number of remote devices to be managed becomes one or more before the continuation period elapses. The controlling step also may comprise stopping the operation of the wireless communication apparatus as the master station after the lapse of the continuation period, if the number of remote devices to be managed remains zero until the continuation period elapses.

According to yet other embodiments of the invention, a wireless communication apparatus configured to operate selectively as a master station or a remote station in a wireless network may comprise: a management unit configured to manage one or more remote devices that operate as remote stations in the particular wireless network, when the wireless communication apparatus operates as the master station in a particular wireless network; and an operation controller configured to continue the operation of the wireless communication apparatus as the master station, when the wireless communication apparatus operates as the master station in the particular wireless network, until a continuation period elapses when the number of remote devices to be managed is zero. The continuation period may begin at a time when the number of remote devices to be managed becomes zero. If the number of remote devices to be managed becomes one or more before the continuation period elapses, the operation controller may continue the operation of the wireless communication apparatus as the master station in the particular wireless network, even after a lapse of the continuation period. If the number of remote devices to be managed remains zero until the continuation period elapses, the operation controller may stop the operation of the wireless communication apparatus as the master station after the lapse of the continuation period.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present invention, needs satisfied thereby, and the objects, features, and advantages thereof, reference now may be made to the following descriptions taken in connection with the accompanying drawings.

FIG. 7 depicts specific examples according to the another embodiment.

DETAILED DESCRIPTION OF EMBODIMENTS OF THE INVENTION (Configuration of System)

Figure 1:
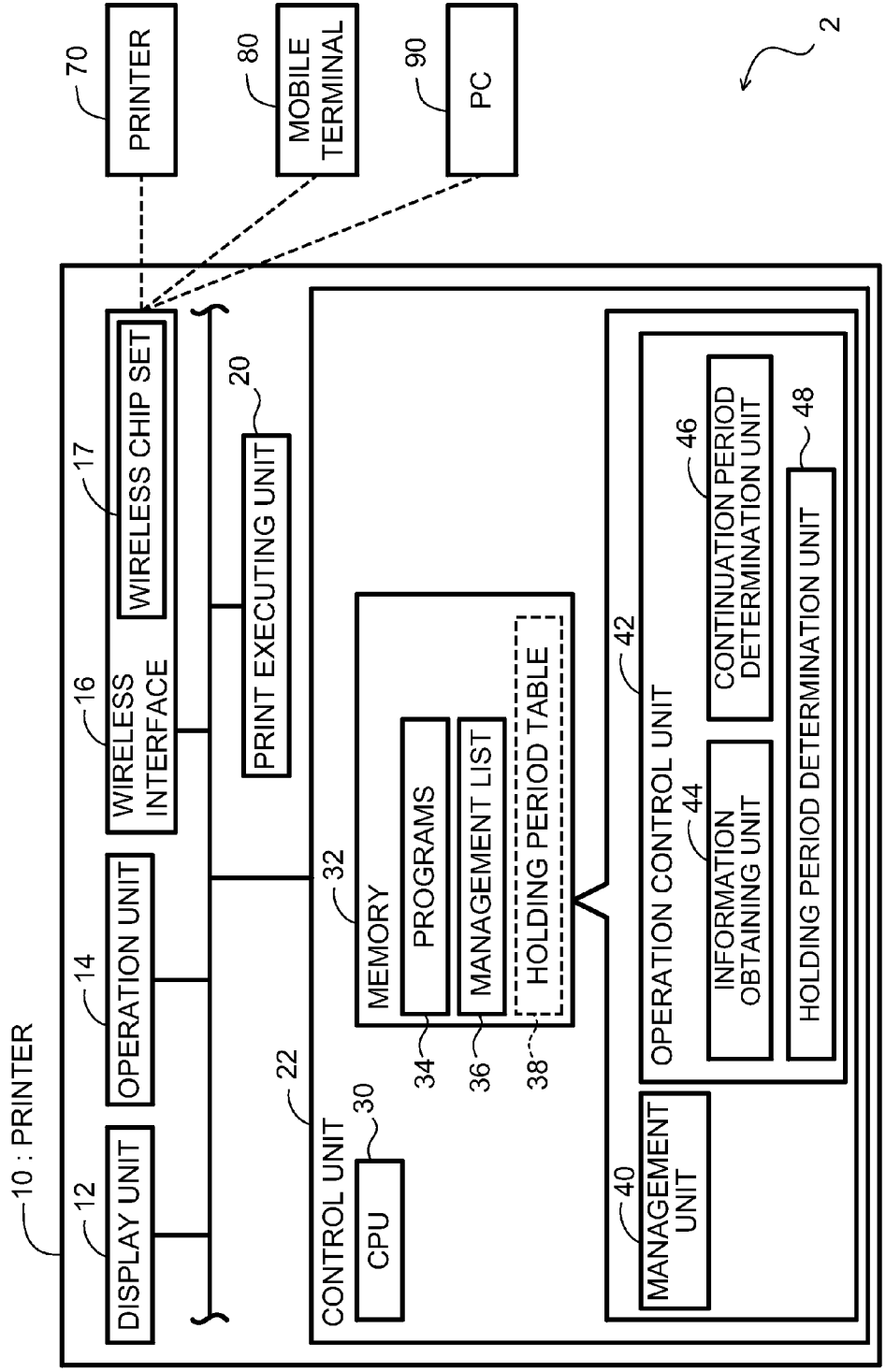
FIG. 1 depicts an exemplary configuration of a communication system.

As depicted in FIG. 1, a communication system 2 may have printers 10 and 70, a mobile terminal 80, and a personal computer (PC) 90. These devices 10, 70, 80, and 90 may execute a wireless communication function according to WFD, which are described hereafter in more detail. The wireless communication function according to WFD is referred to as the "WFD function" hereinafter. The devices 10, 70, 80, and 90 may comprise a wireless network by establishing wireless connection in accordance with WFD. As a result, the devices 10, 70, 80, and 90 may execute wireless communication of target data to be communicated, such as print data.

(Configuration of Printer 10)

The printer 10 may have a display unit 12, an operation unit 14, a wireless interface 16, a print execution unit 20, and a control unit 22. These components 12 to 22 may be connected to a bus (reference numeral omitted). The display unit 12 may be a display for displaying various pieces of information. The operation unit 14 may comprise a plurality of keys. Operation of the operation unit 14 may issue various instructions to the printer 10. The wireless interface 16 may be an interface for executing wireless communication. The wireless interface 16 may comprise a wireless chip set 17, for example, "BCM4319" manufactured and sold by Broadcom Corp. The functions of the wireless chip set 17 are described hereafter in more detail. The print execution unit 20 may have a print mechanism adopting a method, such as an inkjet method or a laser method, and may execute printing in accordance with an instruction from the control unit 22.

The control unit 22 may have a central processing unit (CPU) 30 and a memory 32. The CPU 30 may execute various processes in accordance with programs 34 stored in the memory 32. The memory 32 may comprise a read-only memory (ROM), a random-access memory (RAM), a hard disk, or the like. The memory 32 may store a management list 36, which is described hereafter in more detail, in addition to the programs 34. A holding period table 38, indicated by broken lines, may be utilized in embodiments of the invention. A management unit 40 and an operation control unit 42 may function according to processes or instructions executed by the CPU 30, in accordance with the programs 34. The operation control unit 42 may have an information obtaining unit 44, a continuation period determination unit 46, and a holding period determination unit 48. The holding period determination unit 48 may be a function utilized in embodiments of the invention.

(Configurations of Printer 70, Mobile terminal 80, and PC 90)

The printer 70 may have a similar configuration to the printer 10 or may have a configuration that differs in various aspects with the printer 10. Each of the mobile terminal 80 and the PC 90 may have a CPU, a memory, and a display, which are not depicted.

(WFD)

As described above, the devices 10, 70, 80, and 90 may execute the WFD function. WFD is described in "Wi-Fi Peer-to-Peer (P2P) Technical Specification Version 1.1," created by the Wi-Fi Alliance. In WFD, three states, namely a group owner state (hereinafter referred to as the "G/O state"), a client state, and a device state, may be defined as the states of a device. The devices (e.g., the printers 10 and 70, the mobile terminal 80, and the PC 90), which may execute the WFD function, may be capable of selectively operating in one of the three states.

A single wireless network may be configured to comprise a device in the G/O state and a device in the client state. In a single wireless network, the number of devices in the G/O state may be invariably one, but the number of devices in the client state may be one or more. A device in the G/O state may manage one or more devices in the client state. More specifically, the device in the G/O state may store a management list (e.g., management list 36, depicted in FIG. 1), which may comprise identification information (e.g., media access control (MAC) addresses) regarding the one or more devices in the client state. When a device in the client state has newly joined the wireless network, the device in the G/O state may add identification information regarding the joined device in the client state to the management list, and when a device in the client state has been removed from the wireless network, the device in the G/O state may delete identification information regarding the removed device in the client state from the management list.

The device in the G/O state may execute wireless communication of target data, such as data (e.g., print data) comprising information in the network layer of the Open Systems Interconnections (OSI) model, to be communicated with devices registered in the management list, i.e., devices in the client state. Nevertheless, while the device in the G/O state may execute wireless communication of data (for example, data that does not comprise information in the network layer (i.e., data in the physical layer, such as a probe request signal or a probe response signal)) for joining a device that has not been registered in the management list to the wireless network with the device, the device in the G/O state may not execute wireless communication of the above-described target data. For example, the printer 10 in the G/O state may receive print data wirelessly from the mobile terminal 80 registered in the management list 36 (i.e., the mobile terminal 80 in the client state), but may not receive print data wirelessly from a mobile terminal that is not registered in the management list 36.

In addition, the device in the G/O state may relay wireless communication of target data (e.g., print data) between a plurality of devices in the client state. For example, when the mobile terminal 80 in the client state wirelessly transmits print data to the other printer 70 in the client state, the mobile terminal 80 first wirelessly transmits the print data to the printer 10 in the G/O state, and the printer 10 then wirelessly transmits the print data to the printer 70. In other words, the device in the G/O state may function as an access point (AP) in a wireless network.

A device that has not joined a wireless network (i.e., a device that has not been registered in the management list) may be a device in the device state. A device in the device state may execute wireless communication of data for joining a wireless network, but may not execute wireless communication of target data (e.g., print data or the like) through the wireless network.

(Method for Executing Wireless Connection According To WFD)

As a method for executing wireless connection according to WFD, wireless connection methods according to Wi-Fi Protected Setup (WPS) may be used. The wireless connection methods according to WPS may comprise a Push Button Configuration (PBC) method and a Personal Identification Number (PIN) code method. In either method, to establish a wireless connection between a pair of devices (e.g., the printer 10 and the printer 70), the pair of devices may execute a WPS negotiation (described hereafter in more detail). In the PIN code method, a PIN code, displayed on one of the devices, may be input to the other device. On the other hand, in the PBC method, certain operations corresponding to pressing buttons provided on each of the devices may be performed.

(Wireless Connection Process)

Figure 2:
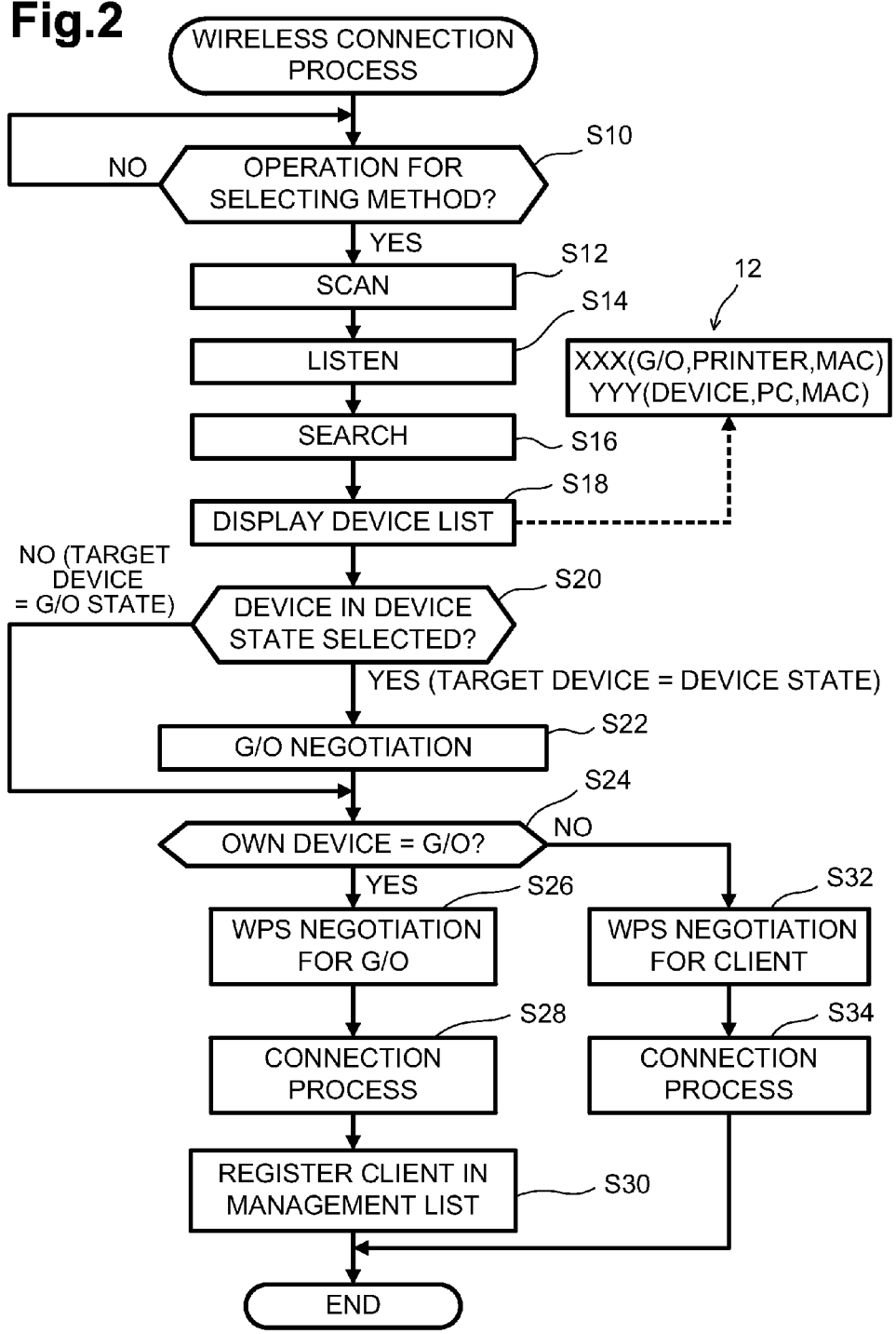
FIG. 2 is a flowchart depicting a wireless communication process.

Referring to FIG. 2, details of a wireless connection process executed by the printer 10 in the device state now are described. In FIG. 2, the printer 10 may wirelessly communicate with other devices.

While a power supply of the printer 10 is on, the control unit 22 of the printer 10 may monitor whether or not an operation for selecting a method is performed (S10). The operation for selecting a method (e.g., the PIN code method or the PBC method) through the operation unit 14 of the printer 10 may be performed. When the PBC method is selected, the operation for selecting a method may correspond to pressing buttons provided on each of the devices. When the operation for selecting a method has been performed, the control unit 22 judges S10 to be YES, and the process may proceed to S12.

At S12, the information obtaining unit 44 (depicted in FIG. 1) may execute a scan process. The scan process may be a process for searching for a device in the G/O state (hereinafter referred to as the "G/O state device") around the printer 10. A G/O state device may use one of first to thirteenth channels. Therefore, the information obtaining unit 44 may use the thirteen channels sequentially, i.e., the first to thirteenth channels, in the scan process in order to sequentially transmit probe request signals.

Upon receiving a probe request signal from the printer 10, a G/O state device may transmit a probe response signal to the printer 10. The probe response signal transmitted from the G/O state device may comprise an Information Element (IE) and the MAC address of the G/O state device. The IE may comprise information indicating that the G/O state device is in the G/O state and information indicating a device name and a category, such as the printer, the PC, the mobile terminal, or the like, of the G/O state device. The information obtaining unit 44 may analyze probe response signals received in the scan process in order to find G/O state devices around the printer 10 and obtain information regarding the G/O state devices that have been found.

A device in the device state (hereinafter referred to as the "device state device") may use one of the first, sixth, and eleventh channels. Therefore, when there is another device state device around the printer 10, this device state device also may receive a probe request signal from the printer 10 and may transmit a probe response signal to the printer 10. Nevertheless, the probe response signal from the device state device may comprise information indicating that the device state device is in the device state. A device in the client state (hereinafter referred to as the "client state device") does not transmit a probe response signal to the printer 10, even if the client state device receives a probe request signal from the printer 10. Therefore, by receiving probe response signals from devices around the printer 10 in the scan process, the information obtaining unit 44 may find G/O state devices.

At S14, the control unit 22 may execute a listen process. The listen process may be a process for responding to a probe request signal transmitted from another device state device that may be executing a search process (S16), which is described hereafter in more detail. Thus, upon receiving a probe request signal from the device state device, the control unit 22 may transmit a probe response signal. The probe response signal from the printer 10 may comprise the IE and the MAC address of the printer 10. The IE may comprise information indicating that the printer 10 is in the device state and information indicating the device name and the category of the printer 10. Therefore, because the control unit 22 may transmit the probe response signal in the listen process, the device state device may find the printer 10 in the device state.

At S16, the information obtaining unit 44 may execute the search process. The information obtaining unit 44 may use the three channels sequentially, e.g., the first, sixth, and eleventh channels, in order to sequentially transmit probe request signals. Therefore, the information obtaining unit 44 may receive probe response signals wirelessly from other device state devices. Each probe response signal from a device state device may comprise the IE and the MAC address of the device state device. The IE may comprise information indicating that the device state device is in the device state and information indicating the device name and the category of the device state device. Therefore, the information obtaining unit 44 may analyze probe response signals received in the search process in order to find other device state devices around the printer 10, and may obtain information regarding the device state devices that have been found.

Another G/O state device also may transmit a probe response signal to the printer 10 in response to a probe request signal transmitted in the search process. Nevertheless, the probe response signal may comprise information indicating that the other G/O state device is in the G/O state. As described above, a client state device may not transmit a probe response signal to the printer 10, even if the client state device receives a probe request signal from the printer 10. Therefore, by receiving probe response signals from devices around the printer 10 in the search process, the information obtaining unit 44 may find device state devices.

At S18, the control unit 22 may cause the display unit 12 to display a device list. The device list may comprise the information regarding each device found in S12 and S16 (i.e., the information indicating the state of each device and the device name, the category, and the MAC address of each device obtained in S12 and S16). In the example depicted in FIG. 2, information (e.g., the G/O state, the printer, and the MAC address) regarding a device corresponding to a device name: "XXX" and information (e.g., the device state, the PC, and the MAC address) regarding a device corresponding to a device name: "YYY" may be displayed on the display unit 12 at S18.

Devices around the printer 10 may be recognized by looking at the device list displayed at S18. An operation for selecting a device through the operation unit 14 may be performed in order to select a device with which the printer 10 may establish wireless connection. When the operation for selecting a device has been performed, the process may proceed to S20. A device (for example, the printer 70) selected by the operation for selecting a device is referred to as the "target device," hereinafter.

At S20, the control unit 22 may judge whether or not the target device is in the device state. If the target device selected by the user is in the device state (for example, if the device corresponding to the device name: "YYY," depicted in FIG. 2, is selected), the control unit 22 may judge S20 to be YES, and the process may proceed to S22. On the other hand, if the target device is in the G/O state (for example, if the device corresponding to the device name: "XXX," depicted in FIG. 2, is selected), the control unit 22 may judge S20 to be NO, and the process may proceed to S24, without executing S22.

For example, if the method selected at S10 is the PIN code method, the control unit 22 may generate a PIN code and may cause the display unit 12 to display the PIN code at a timing between S20 and S22. In this case, the PIN code displayed on the display unit 12 may be input to the target device. Although an example in which a PIN code may be displayed by the printer 10 and input to the target device has been described, a PIN code may be displayed by the target device and input to the printer 10. When the PIN code has been displayed and input, the control unit 22 may execute a G/O negotiation with the target device at S22. As described above, a single wireless network invariably may comprise only one G/O state device. Therefore, by executing the G/O negotiation, the control unit 22 may determine either the printer 10 in the device state or the target device in the device state to be a G/O, and the other to be a client. On the other hand, for example, if the method selected in S10 is the PBC method, a PIN code may be neither displayed nor input at a timing between S20 and S22. In this case, the control unit 22 may execute a G/O negotiation with the target device at S22.

In the G/O negotiation executed at S22, the control unit 22 may transmit information indicating the G/O priority of the printer 10 to the target device, as well as receive information indicating the G/O priority of the target device from the target device. The G/O priority of the printer 10 may be an index indicating how appropriate the printer 10 may be for a G/O, and may be predetermined in the printer 10. Similarly, the G/O priority of the target device may be an index indicating how appropriate the target device may be for a G/O. For example, a device having a CPU and a memory with a relatively high performance (e.g., a PC) may operate as a G/O while executing other processes at high speed. Therefore, the G/O priority of such a device may be set, such that the device is likely to be a G/O. On the other hand, for example, a device having a CPU and a memory with a relatively low performance might not be able to operate as a G/O while executing other processes at high speed. Therefore, the G/O priority of such a device may be set, such that the device is not likely to be a G/O.

The control unit 22 may compare the G/O priority of the printer 10 and the G/O priority of the target device. The control unit 22 may determine a device (the printer 10 or the target device) with a higher G/O priority to be a G/O and a device (the target device or the printer 10) with a lower G/O priority to be a client. The target device may determine a G/O and a client using the same method as the printer 10 based on the G/O priorities of the printer 10 and the target device.

At S22, the operation control unit 42, as depicted in FIG. 1, may switch the state of the printer 10 from the device state to a determined state (i.e., the G/O state or the client state). The target device also may switch from the device state to a determined state (i.e., the client state or the G/O state). When the state of the printer 10 has been switched, the process may proceed to S24.

On the other hand, if the selected target device is in the G/O state (for example, if the device corresponding to the device name: "XXX," depicted in FIG. 2, is selected), the control unit 22 may judge S20 to be NO, and the process may proceed to S24 without executing S22. In this case, the G/O negotiation at S22 may not be executed, and the control unit 22 may determine the state of the printer 10 to be the client state and may switch the state of the printer 10 from the device state to the client state. This may occur because the target device may be in the G/O state and, therefore, it may be preferable for the printer 10 to be in the client state and managed by the target device. For example, if the method selected at S10 is the PIN code method, a screen for displaying or inputting a PIN code may be displayed at a timing between S20 and S24, when S20 has been judged to be NO. At S22, the control unit 22 then may execute provisioning discovery for notifying the target device of whether the particular device (i.e., the printer 10 comprising the control unit 22) displays or inputs the PIN code. On the other hand, for example, if the method selected at S10 is the PBC method, the PIN code may be neither displayed nor input at a timing between S20 and S24, when S20 has been judged to be NO; and the control unit 22 may execute the provisioning discovery for notifying the target device of the use of the PBC method. When the provisioning discovery has been executed, the process may proceed to S24. If S20 has been judged to be YES, the control unit 22 may execute a process corresponding to the provisioning discovery during the G/O negotiation at S22. Therefore, when S20 has been judged to be YES, the control unit 22 may not execute the process corresponding to the provisioning discovery as an independent process.

At S24, the control unit 22 of the printer 10 may judge whether or not the current state of the printer 10 is the G/O state. If S24 is judged to be YES (e.g., the current state of the printer 10 is the G/O state and the current state of the target device is the client state), the process may proceed to S26. On the other hand, if S24 is judged to be NO (e.g., the current state of the printer 10 is the client state, and the current state of the target device is the G/O state), the process may proceed to S32.

At S26, the control unit 22 may execute a WPS negotiation for the G/O state. For example, if the method selected in S10 is the PIN code method, the control unit 22 may convert particular data (for example, latest packet data communicated between the printer 10 and the target device) into a hash code using the PIN code displayed by the printer 10 or input to the printer 10. On the other hand, the target device may convert particular data into a hash code using the PIN code input to the target device or displayed by the target device. Either the printer 10 (the control unit 22) or the target device then may judge whether or not the hash code generated by the printer 10 and the hash code generated by the target device match. If the method selected at S10 is the PBC method, for example, each of the printer 10 (the control unit 22) and the target device may convert particular data into a hash code using a predetermined PIN code. In addition, either the printer 10 or the target device may judge whether or not the two hash codes match. In this embodiment, a service set identifier (SSID), an authentication method, and an encryption method may be determined in advance. In addition, the SSID and a password (e.g., network key) may be generated by the control unit 22 in the processing at S26 or may be determined in advance.

If the two hash codes match, i.e., if the authentication of the PIN code may be completed, the control unit 22 may transmit the wireless profile to the target device. As a result, the printer 10 and the target device may use the same wireless profile.

At S28, the control unit 22 may execute a connection process in relation to the target device using the wireless profile. In other words, the control unit 22 may execute wireless communication of an authentication request, an authentication response, an association request, an association response, and a 4-way handshake with the target device, using the wireless profile. In this process, the printer 10 and the target device may execute various authentication processes, such as confirmation of matching between passwords (e.g., network keys) thereof. When matching between passwords (e.g., network keys) has been confirmed, and the authentication process has been completed, wireless connection may be established between the printer 10 and the target device. Thus, a wireless network comprising the printer 10 and the target device may be established. When matching between passwords (e.g., network keys) has been confirmed, a key to be utilized for encrypting communication of target data may be generated.

At S30, the management unit 40 (depicted in FIG. 1) may register the MAC address of the target device in the client state in the management list 36, stored in the memory 32. The probe response signal, obtained in the search process at S16, may comprise the MAC address of the target device. When S30 has been completed, the wireless connection process may end.

At S32, the control unit 22 may execute a WPS negotiation for the client state. More specifically, the control unit 22 may receive a wireless profile (e.g., an SSID, an authentication method, an encryption method, and/or a password) necessary to establish wireless connection wirelessly from the target device. For example, if the method selected in S10 is the PIN code method, each of the printer 10 and the target device may convert particular data into a hash code using the PIN code displayed by the printer 10 or input to the printer 10, and whether or not the two hash codes match may be determined. If the two hash codes match, the control unit 22 may receive the wireless profile wirelessly from the target device. If the method selected at S10 is the PBC method, for example, each of the printer 10 and the target device may convert particular data into a hash code using a predetermined PIN code, and whether or not the two hash codes match may be determined. If the two hash codes match, the control unit 22 may wirelessly receive the wireless profile from the target device. As a result, the printer 10 and the target device may use the same wireless profile.

At S34, the control unit 22 may execute the connection process in relation to the target device using the wireless profile in the same manner as described above regarding S28.

As a result, the wireless connection may be established between the printer 10 and the target device. When S34 has been completed, the wireless connection process may end.

For example, if the printer 10 is in the G/O state, the printer 10 may communicate target data (e.g., print data) to be communicated with the target device in the client state. The target data may comprise data in the network layer, which may be a layer higher than the physical layer in the OSI reference model. Therefore, the printer 10 in the G/O state may execute wireless communication in the network layer with the target device in the client state. Furthermore, the printer 10 in the G/O state may relay wireless communication between the target device in the client state and another device in the client state registered in the management list.

(G/O Process)

Figure 3:
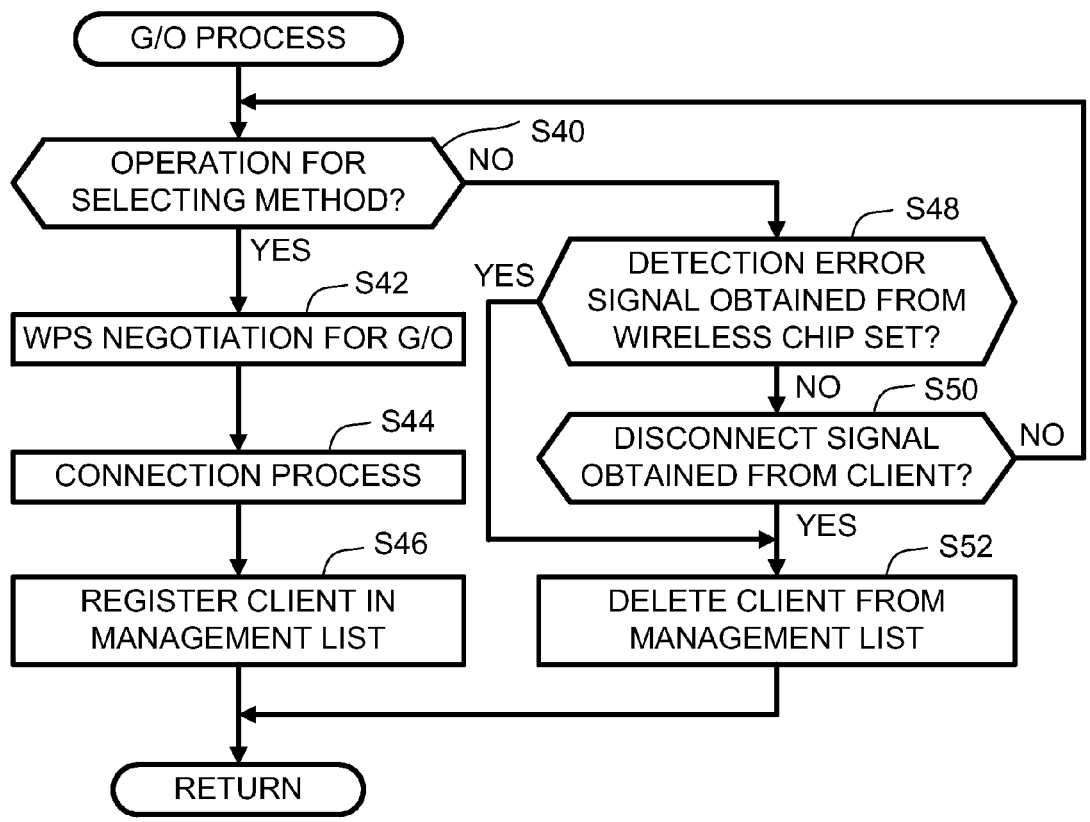
FIG. 3 is a flowchart depicting a G/O process.

Referring to FIG. 3, a process to be executed when the printer 10 operates as a G/O now is described in more detail. At S40, the control unit 22 may monitor whether or not an operation for selecting a method is performed, the operation being executed by a user using the operation unit 14. When the operation for selecting a method has been performed (i.e., YES at S40), the process may proceed to S42.

The operation for selecting a method for a device (i.e., "target device") with which the printer 10 in the G/O state may establish wireless connection may be performed. In this case, the target device may find the printer 10 in the scan process and cause a display unit thereof to display a device list comprising the printer 10. If the printer 10 is selected from the device list, the target device may transmit a connection request to the printer 10. The connection request received from the target device may comprise various pieces of information, such as the MAC address and the category of the target device. Thus, the information obtaining unit 44 of the printer 10 may obtain various pieces of information regarding the target device. After transmitting the connection request to the printer 10, the target device may switch to the client state. This may occur because the printer 10 may be in the G/O state, and, therefore, the target device may not switch to the G/O state.

Upon receiving the connection request from the target device, the control unit 22 may execute a WPS negotiation for the G/O state at S42, similar to S26, as depicted in FIG. 2.

As a result of the processing at S42, the printer 10 and the target device may use the same wireless profile. At S44, the control unit 22 may execute a connection process using the wireless profile, similar to S28, as depicted in FIG. 2. At S46, the management unit 40 may newly register the MAC address of the target device in the client state in the management list 36, stored in the memory 32. The connection request received from the target device may comprise the MAC address of the target device. When S46 has been completed, the process may return to S40.

At S48, the management unit 40 may monitor whether or not a detection error signal is obtained from the wireless chip set 17, as depicted in FIG. 1. A device in the client state (i.e., the "client state device") registered in the management list 36 may transmit signals (hereinafter referred to as the "regular signals") to the printer 10 in the G/O state. The wireless chip set 17 may receive the regular signals transmitted by the client state device. For example, when the mobile terminal 80 is the client state device, the mobile terminal 80 may move out of the range within which wireless communication with the printer 10 is possible. In addition, for example, wireless communication between the printer 10 and the client state device may be impossible due to a communication failure or the like. Further, for example, the power of the client state device may be turned off. In such cases, the wireless chip set 17 may not receive the regular signals transmitted from the client state device. When a state in which the wireless chip set 17 may not receive the regular signals from the client state device continues for a predetermined period, the wireless chip set 17 may supply a detection error signal to the management unit 40. The detection error signal may comprise the MAC address of the client state device for which regular signals may not be detected. If the management unit 40 obtains the detection error signal (i.e., YES at S48), the process may proceed to S52. On the other hand, if the management unit 40 does not obtain the detection error signal (i.e., NO at S48), the process may proceed to S50.

At S50, the management unit 40 may monitor whether or not a disconnect signal is obtained from a client state device. For example, if a user wants to remove a client state device from the wireless network, the user may perform a predetermined operation for the client state device. In this case, the client state device may transmit wirelessly a disconnect signal, indicating that the client state device is being removed from the wireless network, to the printer 10 in the G/O state. The disconnect signal may comprise the MAC address of the client state device that has transmitted the disconnect signal. When the management unit 40 has obtained the disconnect signal (i.e., YES at S50), the process may proceed to S52.

At S52, the management unit 40 may delete the MAC address in the detection error signal, obtained at S48, or the MAC address in the disconnect signal, obtained at S50, from the management list 36. As a result of the deletion process at S52, the client state device removed from the wireless network may no longer be a target to be managed by the management unit 40. Hereinafter, the management unit 40 deleting a MAC address in a detection error signal from the management list 36 will be referred to as "a client state device may be removed from the wireless network due to a detection error." In addition, deleting the MAC address in a disconnect signal from the management list 36 by the management unit 40 is referred to as "a client state device may be removed from the wireless network due to a disconnect signal." When S52 has been completed, the process may return to S40.

In an embodiment, when deleting the MAC address of a last client state device (hereinafter referred to as the "last client") from the management list 36 at S52, the management unit 40 may cause a temporary storage area of the memory 32 to store the MAC address of the last client and the time (hereinafter referred to as the "last removal time") at which the MAC address of the last client is deleted. In particular, if the management unit 40 obtains a disconnect signal from the last client (i.e., YES at S50), the management unit 40 also may cause the temporary storage area to store a flag indicating that the disconnect signal has been obtained. Nevertheless, if the management unit 40 does not obtain a disconnect signal (e.g., if the last client is removed due to a detection error (i.e., YES at S48)), the management unit 40 may not cause the temporary storage area to store the flag.

(G/O Stop Process)

Figure 4:
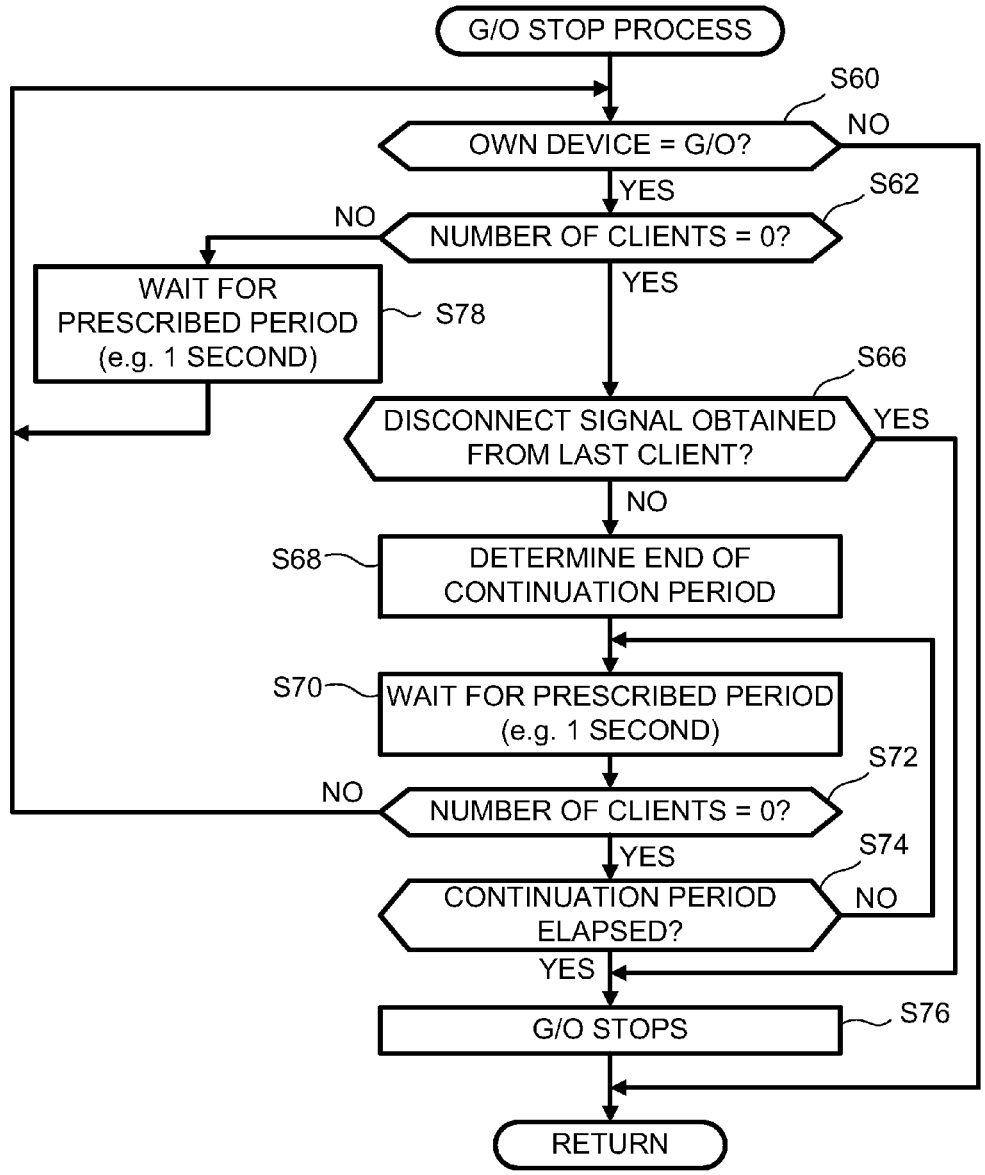
FIG. 4 is a flowchart depicting a G/O stop process according to an embodiment of the invention.

Referring to FIG. 4, a G/O stop process executed by the printer 10 according to an embodiment now is described in more detail. At S60, the control unit 22 may judge whether or not the current state of the device (i.e., the printer 10 comprising the control unit 22) may be the G/O state. If S60 is judged to be NO (e.g., if the printer 10 is in the device state or the client state), the control unit 22 may not execute the processing of S62 through S78. On the other hand, if S60 is judged to be YES (e.g., if the printer 10 is in the G/O state), the process may proceed to S62.

At S62, the management unit 40 may judge whether or not the number of client state devices is zero. More specifically, the management unit 40 may judge whether or not the total number of MAC addresses stored in the management list 36 is zero. If S62 is judged to be NO (e.g., if the total number of MAC addresses stored in the management list 36 is one or more), the process may proceed to S78. At S78, the management unit 40 may wait for a prescribed time period (for example, 1 second), and then the process may return to S60.

On the other hand, if S62 is judged to be YES (e.g., if the number of MAC addresses stored in the management list 36 is zero), the process may proceed to S66. At S66, the management unit 40 may judge whether or not a disconnect signal has been obtained from the last client. More specifically, at S66, the management unit 40 may judge whether or not a flag indicating that a disconnect signal has been received is stored in the temporary storage area of the memory 32. If S66 is judged to be YES (e.g., if a flag indicating that a disconnect signal has been obtained is stored), the process may proceed to S76, without executing the processing of S68 through S74.

At S76, the operation control unit 42 may switch the state of the printer 10 from the G/O state to the device state in order to stop the operation of the printer 10 as a G/O. In other words, if S66 is judged to be YES, the operation control unit 42 may stop the operation of the printer 10 as a G/O immediately in order to refrain from executing the processing of S68 through S74. When the operation of the printer 10 as a G/O has been stopped, the wireless network may be lost. Therefore, the printer 10 may no longer wirelessly communicate target data (e.g., print data) with other devices. In addition, the printer 10 may no longer relay wireless communication of target data between a plurality of devices in the client state. At S76, the operation control unit 42 may discard the wireless profile (i.e., the wireless profile transmitted at S26, depicted in FIG. 2, or S42, depicted in FIG. 3) that has been used in the wireless network. When S76 has been completed, the process may return to S60.

On the other hand, if S66 is judged to be NO (e.g., if a flag indicating that a disconnect signal has been obtained is not stored), the process may proceed to S68. At S68, the continuation period determination unit 46, as depicted in FIG. 1, may determine the end of a continuation period. More specifically, the continuation period determination unit 46 may determine the end of the continuation period by adding a predetermined time period (for example, 1 minute) to the last removal time stored in the temporary storage area of the memory 32.

At S70, the operation control unit 42 may wait for a predetermined time period (for example, 1 second). Thereafter, at S72, the management unit 40 may judge whether or not a state in which the number of clients is zero continues. The judgment process at S72 may be similar to that at S62. If S72 is judged to be YES (e.g., if the number of clients is zero), the process may proceed to S74.

On the other hand, if S72 is judged to be NO (e.g., if the number of clients is one or more), the process may return to S60. An example of the state in which the number of clients becomes one or more may be as follows: a communication failure may occur between the printer 10 and the last client, and the last client may be removed from the wireless network due to a detection error. Thereafter, the operation for selecting a method for the device that may have been the last client and the printer 10 may be performed. In this case, S40, as depicted in FIG. 3, may be judged to be YES and, after S42 and S44, the device that has been the last client may be registered in the management list 36 again at S46. Thus, the number of clients may become one or more, and S72 may be judged to be NO.

At S74, the operation control unit 42 may judge whether or not the continuation period, the end of which has been determined at S68, has elapsed. If S74 is judged to be NO (e.g., if the continuation period has not yet elapsed), the process may return to S70. On the other hand, if S74 is judged to be YES (e.g., if the continuation period has elapsed), the process may proceed to S76.

At S76, the operation control unit 42 may switch the state of the printer 10 from the G/O state to the device state in order to stop the operation of the printer 10 as a G/O. If S66 is judged to be NO, since the processing at S68 through S74 is executed, the operation control unit 42 may not stop the operation of the printer 10 as a G/O immediately, even after the last client is removed. After the lapse of the continuation period, the operation control unit 42 may stop the operation of the printer 10 as a G/O.

Figure 5:
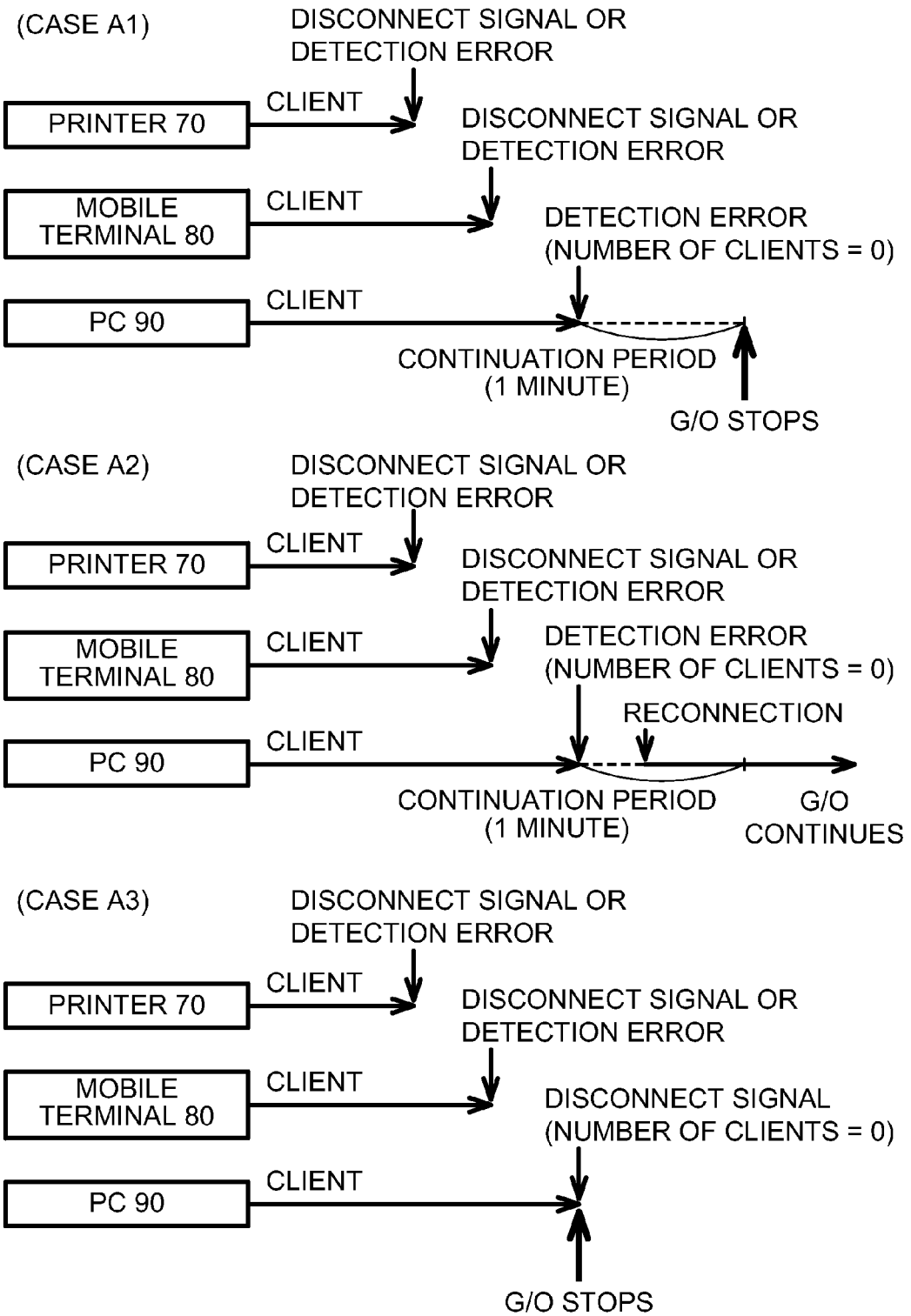
FIG. 5 depicts specific examples according to an embodiment of the invention.

Referring to FIG. 5, several examples, in which the G/O stop process, as depicted in FIG. 4, may be applied, are described in more detail. In FIG. 5, the printer 10 may operate as a G/O; and the printer 70, the mobile terminal 80, and the PC 90, as depicted in FIG. 1, may operate as clients.

(Case A1)

The printer 70 may be removed from the wireless network due to a disconnect signal or a detection error. The mobile terminal 80 then may be removed from the wireless network due to a disconnect signal or a detection error. Thus, in this example, the PC 90 may be the last client. The PC 90 may be removed from the wireless network due to a detection error (i.e., YES at S48 and the process may proceed to S52, as depicted in FIG. 3). Accordingly, the number of client devices (i.e., the number of clients) managed by the printer 10 becomes zero (i.e., YES at S62, as depicted in FIG. 4). As described above, the PC 90, which may be the last client, may have been removed from the wireless network due to a detection error. Therefore, the printer 10 may judge S66, as depicted in FIG. 4, to be NO, and may determine the end of the continuation period (for example, 1 minute) at S68, as depicted in FIG. 4. The printer 10 may continue operating as a G/O until the continuation period elapses. In this example, the number of clients may remain zero until the continuation period elapses. Therefore, the printer 10 may switch states, from the G/O state to the device state, after the lapse of the continuation period, and may stop operating as a G/O at S76, as depicted in FIG. 4.

(Case A2)

In this example, as with Case A1, the printer 70 and then the mobile terminal 80 may be removed from the wireless network. The PC 90, which may be the last client, may be removed from the wireless network due to a detection error, as in Example Al (i.e., NO at S66, as depicted in FIG. 4). Thus, the printer 10 may determine the end of the continuation period (for example, 1 minute). In this example, a wireless network may be reestablished (i.e., reconnected) between the printer 10 and the PC 90 before the continuation period elapses. Therefore, the number of clients may become one before the continuation period elapses (i.e., NO at S72). Consequently, the printer 10 may continue operating as a G/O, even after the lapse of the continuation period.

(Case A3)

In this example, as with Case A1, the printer 70 and then the mobile terminal 80 may be removed from the wireless network. The PC 90, which may be the last client, may be removed from the wireless network due to a disconnect signal (i.e., YES at S66, as depicted in FIG. 4). Therefore, the printer 10 may immediately stop operating as a G/O at S76, without executing the processing of S68 through S74, depicted in FIG. 4. In other words, unlike Case A1, in which the printer 10 may continue operating as a G/O until the continuation period elapses, in this example, the printer 10 may stop operating as a G/O before the continuation period elapses.

In communication system 2, described above, if the number of client state devices becomes zero (i.e., YES at S62, as depicted in FIG. 4), the printer 10 may continue operating as a G/O until the continuation period, which begins when the number of client state devices becomes zero, elapses. If the number of client state devices becomes one or more before the continuation period elapses, the printer 10 may continue operating as a G/O, even after the lapse of the continuation period, similar to Case A2, as depicted in FIG. 5. If the number of client state devices remains zero until the continuation period elapses, the printer 10 may stop operating as a G/O in the wireless network upon the lapse of the continuation period, similar to Case A, as depicted in FIG. 5. As a result, for example, the printer 10 may not need to construct the wireless network again immediately after the wireless network is lost.

For example, a mobile device (e.g., the mobile terminal 80) may be a client state device. In this example, when carried, the mobile device may be removed from the wireless network due to a detection error. According to embodiments of the invention, in such a case, the printer 10 may not stop operating as a G/O immediately, and may continue operating as a G/O until the continuation period elapses. Therefore, if the mobile device is reconnected to the wireless network before the continuation period elapses, it may be sufficient for the printer 10 to execute the processing of S42 through S46, as depicted in FIG. 3. In other words, the printer 10 may not need to execute the processing of S12 through S22, as depicted in FIG. 2. Accordingly, the processing load of the printer 10 may be reduced. Thus, the printer 10 may execute operation as a G/O.

As described above, in embodiments of the invention, when a disconnect signal has been obtained from the last client, the printer 10 may stop operating as a G/O immediately, without providing the continuation period, similar to Case 3, as depicted in FIG. 5. When a disconnect signal is obtained from the last client, a user of the last client may wish to remove the last client from the wireless network. Thus, in such a case, the printer 10 may stop operating as a G/O immediately because it is unlikely that the last client will be connected to the wireless network again. As a result, the printer 10 may stop operating as a G/O at an earlier point in time, thereby reducing the processing load (i.e., the load of processing as a G/O) of the printer 10. Further, the printer 10 may determine whether or not to provide the continuation period in accordance with whether or not a disconnect signal has been obtained from the last client. Therefore, the printer 10 may stop operating as a G/O in accordance with whether or not a disconnect signal has been obtained from the last client.

The printer 10 may be an example of a "wireless communication apparatus." A G/O and a client may be examples of a "master station" and a "remote station," respectively. A client state device may be an example of a "remote device." YES at S62 and NO at S66, as depicted in FIG. 4, may be an example of a "first case." YES at S62 and YES at S66, as depicted in FIG. 4, may be an example of a "second case." The last client may be an example of a "last removed remote device."

In another embodiment, a holding period table 38 may be stored in the memory 32, which is depicted as the broken-line portion in FIG. 1. The holding period table 38 may store the categories (e.g., the printer, the PC, the mobile terminal, or the like) of devices and the periods (e.g., 1 minute, 2 minutes, or the like) associated with each other. In addition to the abovementioned printer, PC, and mobile terminal, the categories of devices stored in the holding period table 38 may comprise, for example, a television set, a game machine, a digital camera, a router, and/or a scanner. In this embodiment, a different period may be associated with each category of devices in the holding period table 38.

For a mobile device (e.g., a mobile terminal), it is likely that the mobile device is temporarily moved out of the range, within which wireless communication of the printer 10 is possible, and then may return to the range, within which wireless communication of the printer 10 is possible. In the holding period table 38, a relatively long period may be associated with such a category of devices. On the other hand, for example, in the case of a stationary device (e.g., a printer, a desktop PC, or the like), it is unlikely that the stationary device returns to the range, within which wireless communication of the printer 10 is possible, once the stationary device moves out of the range, within which the wireless communication of the printer 10 is possible. In the holding period table 38, a relatively short period may be associated with such a category of devices.

In this embodiment, at S30 of FIG. 2, the management unit 40 may register the MAC address of a target device in the client state and the category of the target device, associating the MAC address and the category with each other, in the management list 36 in the memory 32. If S48, as depicted in FIG. 3, is judged to be YES (i.e., if the last client is removed due to a detection error), the management unit 40 may delete the MAC address and the category of the last client from the management list 36 at S52. At this time, the management unit 40 may store the category of the last client in the temporary storage area of the memory 32.

(G/O Stop Process)

Figure 6:
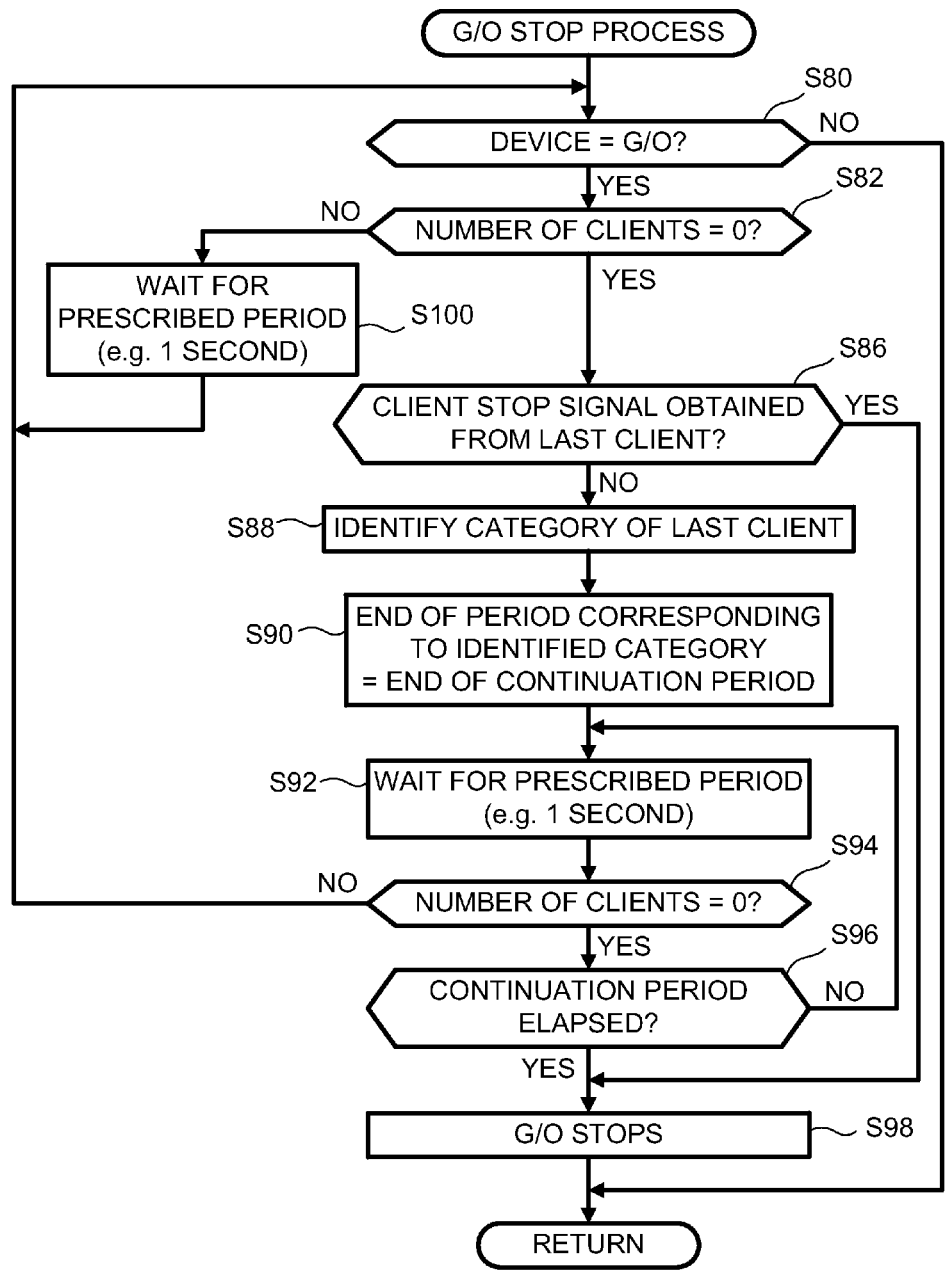
FIG. 6 is a flowchart depicting a G/O stop process according to another embodiment of the invention.

Referring to FIG. 6, a G/O stop process according to an embodiment of the invention now is described in more detail. The processing of S80 through S86 of FIG. 6 may be similar to that of S60 through S66 of FIG. 4. In addition, processing of S100 of FIG. 6 may be similar to that of S78 of FIG. 4.

At S88 (i.e., if the last client is removed due to a detection error), the management unit 40 may identify the category of the last client from the temporary storage area of the memory 32. At S90, the continuation period determination unit 46 may determine the end of the continuation period based on the period corresponding to the category identified at S88. More specifically, at S90, the continuation period determination unit 46 first may identify the period corresponding to the category identified at S88 from the holding period table 38. The continuation period determination unit 46 then may determine the end of the continuation period by adding the identified period to the last removal time stored in the temporary storage area of the memory 32. When S90 has been completed, the process may proceed to S92. The processing of S92 through S98 may be similar to that of S70 to S76 of FIG. 4. When S98 has been completed, the process may return to S80.

Referring to FIG. 7, several examples in which the G/O stop process, as depicted in FIG. 6, may be applied now are described in more detail.

(Case B1)

The PC 90 (e.g., a desktop PC), which may be the last client, may be removed from the wireless network due to a detection error. At this time, the number of clients may become zero (i.e., YES at S82, as depicted in FIG. 6). The printer 10 may identify the category "PC" of the PC 90, which may be the last client (S88). Next, the printer 10 may determine the end of the continuation period by adding the period, (e.g., "1 minute") corresponding to the identified category, "PC," to the last removal time of the PC 90 (S90). After the lapse of the continuation period, the printer 10 may switch the state thereof from the G/O state to the device state, in order to stop operating as a G/O (S98).

As described above, in the holding period table 38, a relatively short period may be associated with the category of a stationary device, such as a desktop PC. Thus, a relatively short period (e.g., 1 minute) may be adopted in this example. This may occur because it is unlikely that a stationary device returns to the range, within which wireless communication of the printer 10 is possible, once the stationary device moves out of the range, within which wireless communication of the printer 10 is possible. Therefore, the printer 10 may stop operating as a master station at an earlier point in time, thereby reducing the processing load of the printer 10.

(Case B2)

In this example, unlike Case B, the printer 70 and then the PC 90 may be removed from the wireless network. The mobile terminal 80, which may be the last client, may be removed from the wireless network due to a detection error. The printer 10 may identify the category "mobile terminal" of the mobile terminal 80, which may be the last client (i.e., S88 of FIG. 6). The printer 10 then may determine the end of the continuation period by adding the period (e.g., "2 minutes") corresponding to the identified category, "mobile terminal," to the last removal time of the mobile terminal 80 at S90. In this example, wireless connection may be reestablished (i.e., reconnected) between the printer 10 and the mobile terminal 80 before the continuation period elapses. Thus, the number of clients may become one before the continuation period elapses (i.e., NO in S94). Therefore, the printer 10 may continue operating as a G/O even after the lapse of the continuation period.

As described above, in the holding period table 38, a relatively long period may be associated with the category of a mobile device, such as a mobile terminal. Thus, a relatively long period (e.g., 2 minutes) may be adopted in this example. This may occur because it is likely that a mobile device returns to the range, within which wireless communication of the printer 10 is possible, after the mobile device moves out of the range, within which wireless communication of the printer 10 is possible. Therefore, when the mobile device returns to the range, within which the wireless communication of the printer 10 is possible, the printer 10 may continue operating as a master station.

In a further embodiment, the holding period table 38 may be stored in the memory 32. Each time the management unit 40 deletes the MAC address of a client state device from the management list 36 at S52, as depicted in FIG. 3, the management unit 40 may store the MAC address of the client state device (hereinafter referred to as the "removed client"), the category of the removed client, and the time (hereinafter referred to as the "removal time") at which the MAC address of the removed client may be removed in the temporary storage area of the memory 32, while associating each these pieces of information with one another. In this example, if a disconnect signal is obtained from the removed client (i.e., YES at S50, as depicted in FIG. 3), the management unit 40 further may store a flag indicating that a disconnect signal has been obtained in the temporary storage area of the memory 32, while associating the flag with the pieces of information described above (e.g., the MAC address, the category, the time, or the like).

(G/O Stop Process)

Figure 8:
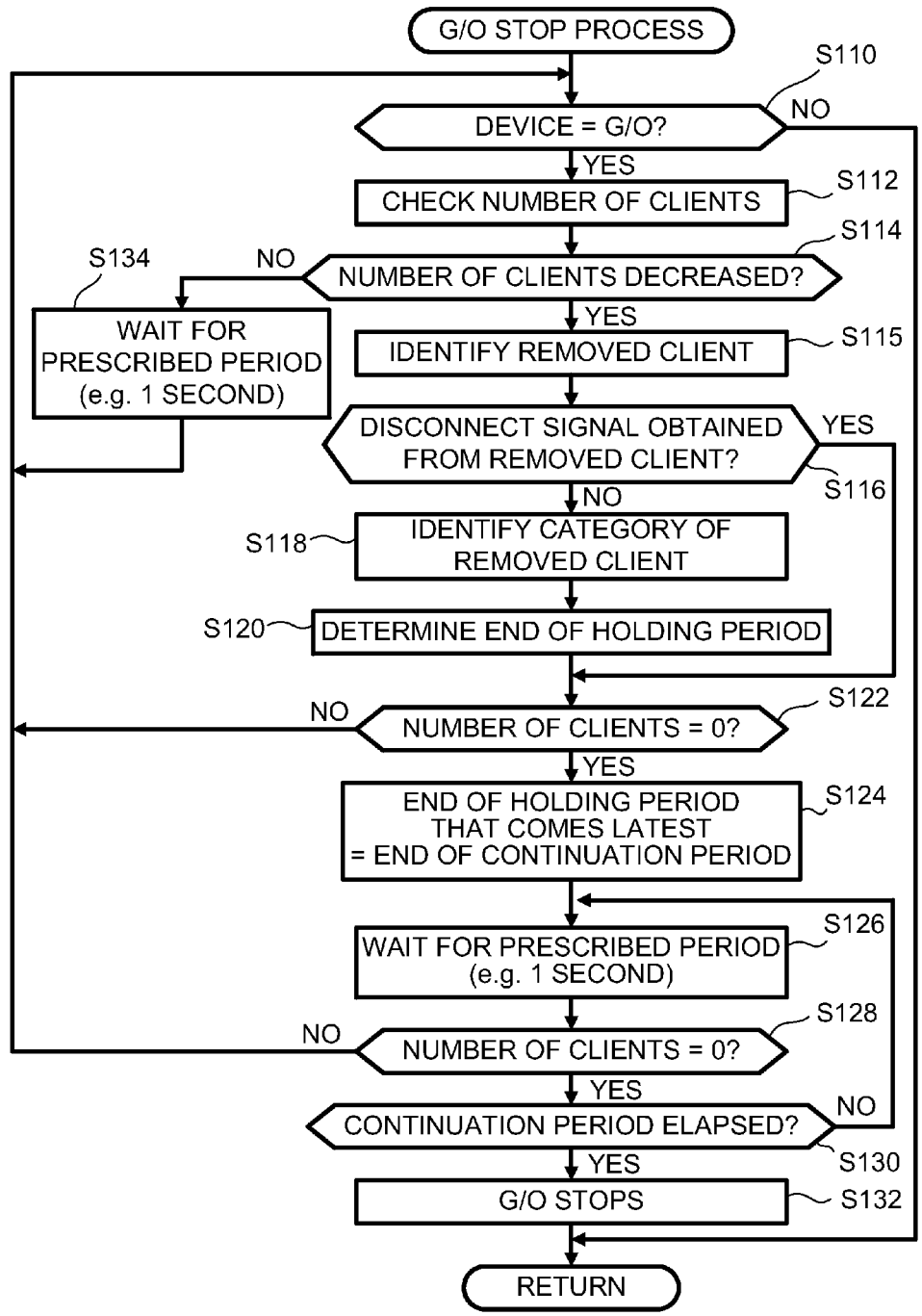
FIG. 8 is a flowchart depicting a G/O stop process according to a further embodiment of the invention.

Referring to FIG. 8, a G/O stop process according to an embodiment of the invention now is described in more detail. The processing of S110 may be similar to that of S60 of FIG.

4. At S112, the management unit 40 may check the number of client state devices. Specifically, the management unit 40 may check the number of MAC addresses stored in the management list 36. At S114, the management unit 40 may judge whether or not the number of client state devices has decreased. Specifically, the management unit 40 may compare the number of client state devices in the previous judgment (i.e., previous S112) and the number of client state devices in the current judgment, in order to judge whether or not the current number of client state devices is less than the previous number of client state devices. If S114 is judged to be NO (i.e., if the number of client state devices has not decreased), the process may proceed to S134. The processing of S134 may be similar to that of S78 of FIG. 4.

On the other hand, if S114 is judged to be YES (i.e., if the number of client state devices has decreased), the management unit 40 may identify a removed client state device at S115. Specifically, the management unit 40 may refer to information regarding removed clients stored in the temporary storage area of the memory 32, and the management unit 40 may identify a MAC address (hereinafter referred to as the "latest removed client") corresponding to the latest removal time.

At S116, the management unit 40 may judge whether or not a disconnect signal has been obtained from the latest removed client. Specifically, the management unit 40 may refer to the temporary storage area of the memory 32 and may judge whether or not a flag indicating that a disconnect signal has been obtained is associated with the MAC address identified at S115. If S116 is judged to be YES (i.e., if a disconnect signal has been obtained), the process may proceed to S122, without executing the processing of S118 and S120 (i.e., without determining a holding period using the holding period determination unit 48, as depicted in FIG. 1). On the other hand, if S116 is judged to be NO (i.e., if a disconnect signal has not been obtained), the process may proceed to S118.

At S118, the holding period determination unit 48 may identify a category corresponding to the MAC address identified at S115 from the temporary storage area of the memory 32. At S120, the holding period determination unit 48 may determine the end of a holding period corresponding to the category identified at S118. Specifically, at S120, the holding period determination unit 48 may identify a period corresponding to the category identified at S118 from the holding period table 38. The holding period determination unit 48 then may determine the end of the holding period by adding the identified period (e.g., 1 minute) to the removal time of the latest removed client.

At S122, the management unit 40 may judge whether or not the number of clients is zero. The processing of S122 may be similar to that of S62 of FIG. 4. If S122 is judged to be YES (i.e., if the number of clients is zero), the continuation period determination unit 46 may determine the end of the continuation period at S124. Specifically, the continuation period determination unit 46 may determine the end of the holding period that is the longest, among one or more holding periods determined at S120, to be the end of the continuation period. The processing of S126 through S132 may be similar to that of S70 through S76 of FIG. 4.

Figure 9:
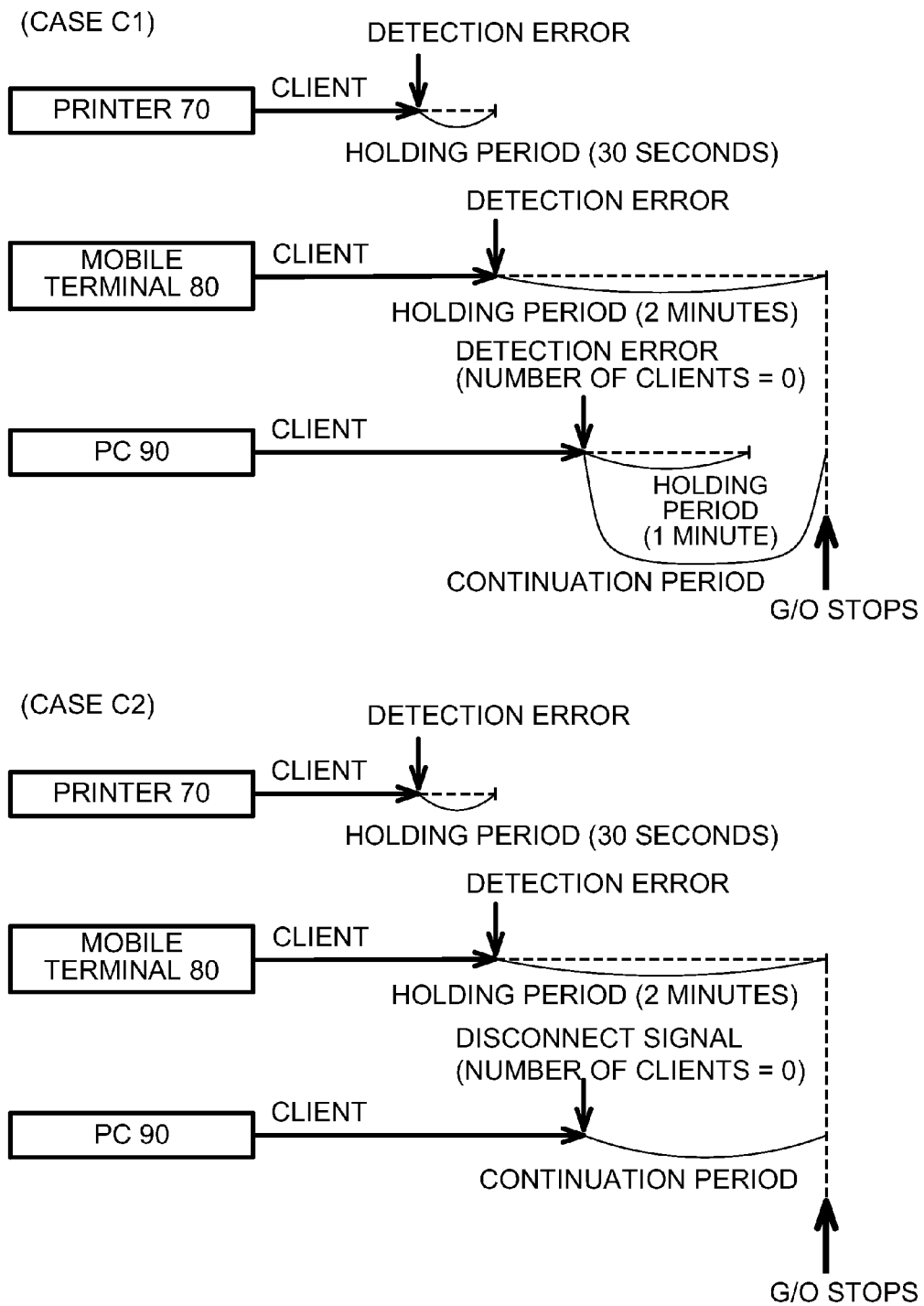
FIG. 9 depicts specific examples according to the further embodiment of the invention.

Referring to FIG. 9, several examples in which the G/O stop process, as depicted in FIG. 8, may be applied now are described in more detail.

(Case C1)

In this example, the printer 70 may be removed from the wireless network due to a detection error. In this case, the printer 10 may refer to the holding period table 38 and may identify the period (e.g., "30 seconds") corresponding to the category: "printer" (S120 in FIG. 8). The printer 10 then may determine the end of the holding period by adding the identified period (e.g., 30 seconds) to the removal time of the printer 70 at S120 in FIG. 8. The mobile terminal 80 also may be removed from the wireless network due to a detection error. In this case, the printer 10 may identify the period (e.g., "2 minutes") corresponding to the category: "mobile terminal," and the printer 10 may determine the end of the holding period at S120 in FIG. 8. The PC 90, which may be the last client, may be removed from the wireless network due to a detection error. In this case, the printer 10 may identify the period (e.g., "1 minute") corresponding to the category: "PC," as the holding period in the same manner as above, and may determine the end of the holding period at S120 in FIG. 8. The printer 10 then may determine the end of the holding period of the mobile terminal 80, which may be the longest holding period, among the three holding periods that have been determined, to be the end of the continuation period at S124. After the lapse of the continuation period, the printer 10 may switch the state thereof from the G/O state to the device state in order to stop operating as a G/O at S132.

(Case C2)

In this example, as with Case C, the printer 70 and then the mobile terminal 80 may be removed from the wireless network, due to detection errors. In the same manner as above, the printer 10 may determine the end of the holding period for each of the printer 70 and the mobile terminal 80 at S120 in FIG. 8. The PC 90, which may be the last client, may be removed from the wireless network due to a disconnect signal. In this case, the printer 10 may not determine the end of the holding period (i.e., YES at S 116). Therefore, the printer 10 may determine the end of the holding period of the mobile terminal 80, which may be the longest among the two holding periods that have been determined, to be the end of the continuation period at S124.

As described above, the printer 10 may determine the end of the continuation period based on holding periods determined for two or more removed clients. In addition, the duration of a holding period to be determined may change in accordance with the category of a removed client. Therefore, the printer 10 may determine the end of the continuation period based on one or more categories of one or more removed clients. In other words, the printer 10 may stop operating as a G/O at an appropriate timing, in accordance with the categories of the one or more removed clients. As described above, if a disconnect signal is obtained from a removed client (i.e., YES at S116), the printer 10 may not determine the holding period based on the category of the removed client. In other words, the printer 10 may determine a continuation period, in accordance with whether or not a disconnect signal has been obtained from the removed client. As a result, the printer 10 may stop operating as a master station at an appropriate timing.

In an additional embodiment, the holding period table 38 may not be stored in the memory 32. Thus, S118 of FIG. 8 may not be executed. At S120 of FIG. 8, the holding period determination unit 48 may identify a predetermined period (for example, 1 minute) as the holding period, regardless of the category of a removed client, and may determine the end of the holding period. If the disconnect signal is obtained from a removed client (i.e., YES at S116 of FIG. 8), the holding period determination unit 48 may not determine the end of the holding period.

Figure 10:
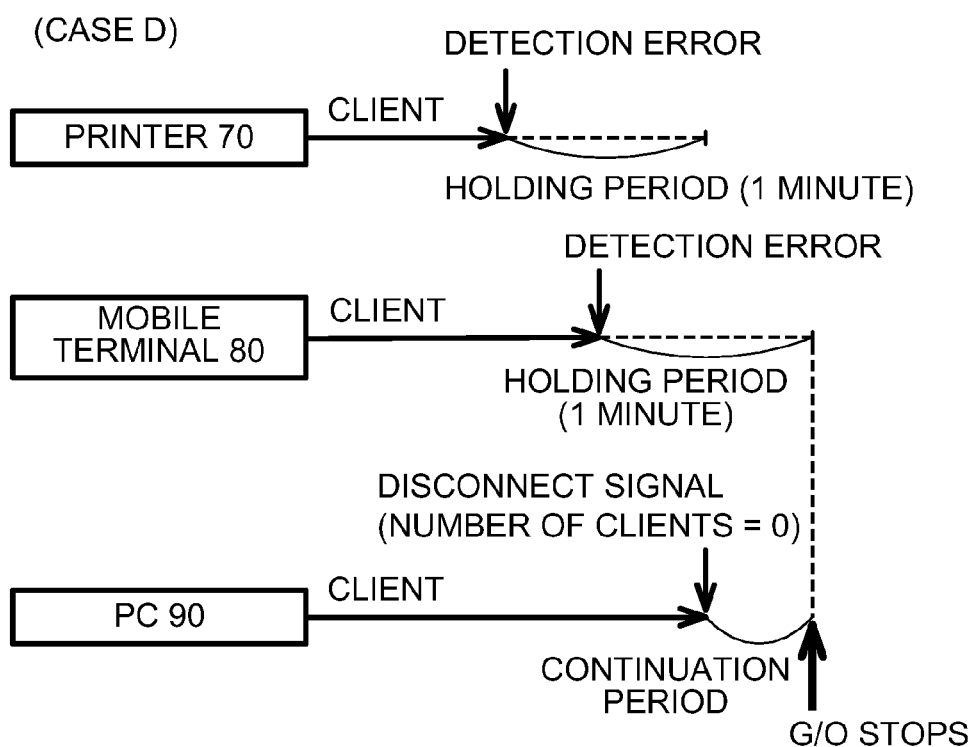
FIG. 10 depicts a specific example according to an additional embodiment of the invention.

Referring to FIG. 10, an example in which the G/O stop process may be applied now is described in more detail.

(Case D)

In this example, the printer 70 may be removed from the wireless network due to a detection error. In this case, the printer 10 may identify a predetermined period (e.g., "1 minute") as the holding period, and the printer 10 may determine the end of the holding period. The mobile terminal 80 also may be removed from the wireless network due to a detection error. In this case, the printer 10 may identify the predetermined period (e.g., "1 minute") as the holding period, and the printer 10 may determine the end of the holding period. The PC 90, which may be the last client, may be removed from the wireless network due to a disconnect signal. In this case, the printer 10 may not determine the end of the holding period. Therefore, the printer 10 may determine the end of the holding period of the mobile terminal 80, which may be the longest among the two holding periods that have been determined, to be the end of the continuation period.

As described above, the printer 10 may or may not determine the holding period in accordance with whether or not a disconnect signal has been obtained from a removed client. Therefore, the printer 10 may stop operating as G/O at an appropriate timing, in accordance with whether or not a disconnect signal has been obtained from the removed client.

Embodiments of the invention are not limited to the above-described embodiments, but may be implemented in various forms with various modifications, without departing from the scope and spirit of the invention. Although not a comprehensive listing of modifications, several exemplary modifications now are described in more detail.

In embodiments of the invention, if a disconnect signal is obtained from the last client, the continuation period determination unit 46 may not determine the continuation period (i.e., S68 may be not executed if S66 of FIG. 4 is judged to be YES). In this case, the operation control unit 42 may stop the operation of the printer 10 as a G/O immediately after the last client is removed at S76 in FIG. 4. Alternatively, even if a disconnect signal is obtained from the last client, the continuation period determination unit 46 may determine the continuation period. In general, when the number of remote devices to be managed becomes zero, the operation control unit 42 may continue the operation of the printer 10 as a master station until the continuation period, which begins when the number of remote devices becomes zero, elapses.

In embodiments of the invention, if a disconnect signal is obtained from a removed client, the holding period determination unit 48 may not determine the holding period. Alternatively, even if a disconnect signal is obtained from a removed client, the holding period determination unit 48 may determine the holding period.

"First-type remote devices" may comprise both a remote device that may be removed by supplying a disconnect signal and a remote device that may be removed without supplying a disconnect signal. A "wireless communication apparatus" is not limited to the printer 10, and the "wireless communication apparatus" may be another device capable of executing wireless communication (e.g., a cell phone, a personal digital assistant (PDA), a PC, a server, a fax machine, a copying machine, a scanner, a multifunction device, or the like).

In the above-described embodiments, the wireless chip set 17 may supply a detection error signal to the management unit 40 when a state in which the regular signals cannot be received from a client state device continues for a predetermined time period (i.e., a detection error). Alternatively, when data (e.g., print data) is to be transmitted to a target client state device, the wireless chip set 17 may supply a detection error signal to the management unit 40 if the transmission of the data is not completed, even after a certain number of trials.

In the above-described embodiments, the components 40 through 48 may comprise the CPU 30 of the printer 10, executing the processing in accordance with software. Alternatively, at least some of the components 40 through 48 may comprise hardware, such as a logic circuit.

While the invention has been described in connection with various example structures and illustrative embodiments, it will be understood by those skilled in the art that other variations and modifications of the structures, configurations, and embodiments described above may be made without departing from the scope of the invention. For example, this application may comprise any possible combination of the various elements and features disclosed herein, and the particular elements and features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or the practice of the invention disclosed herein. It is intended that the specification and the described examples may be illustrative of embodiments of the invention, with the true scope of the invention being defined by the following claims.

What is claimed is:

1. A wireless communication apparatus configured to operate selectively as a group owner or as a client in a Wi-Fi Direct wireless network, comprising:
a processor configured to:
manage one or more remote devices, which operate as clients in a particular Wi-Fi Direct wireless network, when the wireless communication apparatus operates as the group owner in the particular Wi-Fi Direct wireless network; and
continue the operation of the wireless communication apparatus as the group owner, when the wireless communication apparatus operates as the group owner in the particular Wi-Fi Direct wireless network, until a continuation period elapses when the number of remote devices to be managed is zero,
wherein the continuation period begins at a time when the number of remote devices to be managed becomes zero,
wherein, if the number of remote devices to be managed becomes one or more before the continuation period elapses, the processor is configured to continue the operation of the wireless communication apparatus as the group owner in the particular Wi-Fi Direct wireless network, even after a lapse of the continuation period,
wherein, if the number of remote devices to be managed remains zero until the continuation period elapses, the processor is configured to stop the operation of the wireless communication apparatus as the group owner after the lapse of the continuation period,
wherein, when the number of remote devices to be managed becomes zero without obtaining a disconnect signal from a last removed remote device, which is a last device that has been removed from the particular network, among the one or more remote devices to be managed, the processor is configured to continue the operation of the wireless communication apparatus as the group owner until the continuation period elapses, and
wherein, when the number of remote devices to be managed becomes zero while the disconnect signal is obtained from the last removed remote device, the processor is configured to stop the operation of the wireless communication apparatus as the group owner before the continuation period elapses.

2. The wireless communication apparatus according to claim 1, wherein the processor is configured to:
obtain, from each of the one or more remote devices to be managed, category data indicating a category of each of the one or more remote devices to be managed; and
determine an end of the continuation period based on the category data obtained from the one or more remote devices to be managed.

3. The wireless communication apparatus according to claim 2, wherein, when the number of remote devices to be managed becomes zero, the processor is configured to determine the end of the continuation period based only on the category data obtained from a last removed remote device, which is a last device that has been removed from the particular Wi-Fi Direct wireless network among the one or more remote devices to be managed.

4. The wireless communication apparatus according to claim 2, further comprising:
a memory configured to store a plurality of category data and corresponding periods, associating each of the category data with each period,
wherein the processor is configured to determine the end of the continuation period based on a period associated with the category data obtained from the last removed remote device.

5. The wireless communication apparatus according to claim 2, wherein the processor is configured to:
determine a holding period based on the category data obtained from the first-type remote device, each time a first-type remote device, among the one or more remote devices to be managed, is removed from the particular Wi-Fi Direct wireless network, wherein the holding period begins when the first-type remote device is removed from the particular Wi-Fi Direct wireless network; and
when the number of remote devices to be managed becomes zero, determine an end of the holding period that is the longest, among one or more holding periods obtained in the determination of the holding period, as an end of the continuation period.

6. The wireless communication apparatus according to claim 5, wherein, if a second-type remote device, among the one or more remote devices to be managed, is removed from the particular Wi-Fi Direct wireless network, the processor is configured not to determine the holding period,
wherein the first-type remote device is a remote device that is removed from the particular Wi-Fi Direct wireless network without supplying a disconnect signal to the wireless communication apparatus, and
wherein the second-type remote device is a remote device that is removed from the particular Wi-Fi Direct wireless network by supplying the disconnect signal to the wireless communication apparatus.

7. The wireless communication apparatus according to claim 5, further comprising:
a memory configured to store a plurality of category data and corresponding periods, associating each of the category data with each period,
wherein, each time the first-type remote device is removed from the particular Wi-Fi Direct wireless network, the processor is configured to determine an end of the holding period based on a period associated with the category data obtained from the first-type remote device.

8. A wireless communication apparatus configured to operate selectively as a group owner or as a client in a Wi-Fi Direct wireless network, comprising:
a processor configured to:
manage one or more remote devices, which operate as clients in a particular Wi-Fi Direct wireless network, when the wireless communication apparatus operates as the group owner in the particular Wi-Fi Direct wireless network;
continue the operation of the wireless communication apparatus as the group owner, when the wireless communication apparatus operates as the group owner in the particular Wi-Fi Direct wireless network, until a continuation period elapses when the number of remote devices to be managed is zero; and
determine a holding period that begins when the first-type remote device is removed from the particular Wi-Fi Direct wireless network, each time a first-type remote device among the one or more remote devices to be managed is removed from the particular Wi-Fi Direct wireless network, and not determine the holding period if a second-type remote device among the one or more remote devices to be managed is removed from the particular Wi-Fi Direct wireless network,
wherein the continuation period begins at a time when the number of remote devices to be managed becomes zero,
wherein, if the number of remote devices to be managed becomes one or more before the continuation period elapses, the processor is configured to continue the operation of the wireless communication apparatus as the group owner in the particular Wi-Fi Direct wireless network, even after a lapse of the continuation period,
wherein, if the number of remote devices to be managed remains zero until the continuation period elapses, the processor is configured to stop the operation of the wireless communication apparatus as the group owner after the lapse of the continuation period,
wherein the processor is further configured to determine an end of the holding period that is the longest, among one or more holding periods obtained in the determination of the holding period, as an end of the continuation period, when the number of remote devices to be managed becomes zero,
wherein the first-type remote device is a remote device that is removed from the particular Wi-Fi Direct wireless network without supplying a disconnect signal to the wireless communication apparatus, and
wherein the second-type remote device is a remote device that is removed from the particular Wi-Fi Direct wireless network by supplying the disconnect signal to the wireless communication apparatus.

9. The wireless communication apparatus according to claim 8, wherein the processor is configured to:
obtain, from each of the one or more remote devices to be managed, category data indicating a category of each of the one or more remote devices to be managed; and
determine an end of the continuation period based on the category data obtained from the one or more remote devices to be managed.

10. The wireless communication apparatus according to claim 9, wherein, when the number of remote devices to be managed becomes zero, the processor is configured to determine the end of the continuation period based only on the category data obtained from a last removed remote device, which is a last device that has been removed from the particular Wi-Fi Direct wireless network among the one or more remote devices to be managed.

11. The wireless communication apparatus according to claim 10, further comprising:
   a memory configured to store a plurality of category data and corresponding periods, associating each of the category data with each period,
   wherein the processor is configured to determine the end of the continuation period based on a period associated with the category data obtained from the last removed remote device.

12. The wireless communication apparatus according to claim 10, wherein the processor is configured to:
   determine a holding period based on the category data obtained from the first-type remote device, each time a first-type remote device, among the one or more remote devices to be managed, is removed from the particular Wi-Fi Direct wireless network, wherein the holding period begins when the first-type remote device is removed from the particular Wi-Fi Direct wireless network; and
   when the number of remote devices to be managed becomes zero, determine an end of the holding period that is the longest, among one or more holding periods obtained in the determination of the holding period, as an end of the continuation period.

13. The wireless communication apparatus according to claim 12, wherein, if a second-type remote device, among the one or more remote devices to be managed, is removed from the particular Wi-Fi Direct wireless network, the processor is configured not to determine the holding period,
   wherein the first-type remote device is a remote device that is removed from the particular Wi-Fi Direct wireless network without supplying a disconnect signal to the wireless communication apparatus, and
   wherein the second-type remote device is a remote device that is removed from the particular Wi-Fi Direct wireless network by supplying the disconnect signal to the wireless communication apparatus.

14. The wireless communication apparatus according to claim 12, further comprising:
   a memory configured to store a plurality of category data and corresponding periods, associating each of the category data with each period,
   wherein, each time the first-type remote device is removed from the particular Wi-Fi Direct wireless network, the processor is configured to determine an end of the holding period based on a period associated with the category data obtained from the first-type remote device.

15. A non-transitory, computer-readable storage medium comprising computer-readable instructions for a processor of a wireless communication apparatus configured to operate selectively as a group owner or a client in a Wi-Fi Direct wireless network, the computer-readable instructions instructing the processor to perform the steps of:
   managing one or more remote devices that operate as clients in the particular Wi-Fi Direct wireless network, when the wireless communication apparatus operates as the group owner in a particular Wi-Fi Direct wireless network; and
   controlling the operation of the wireless communication apparatus, when the wireless communication apparatus operates as the group owner in the particular Wi-Fi Direct wireless network, to continue as the group owner until a continuation period elapses when the number of remote devices to be managed is zero, wherein the continuation period begins when the number of remote devices to be managed becomes zero,
   wherein the controlling step comprises continuing the operation of the wireless communication apparatus as the group owner in the particular Wi-Fi Direct wireless network, even after a lapse of the continuation period, if the number of remote devices to be managed becomes one or more before the continuation period elapses,
   wherein the controlling step comprises stopping the operation of the wireless communication apparatus as the group owner after the lapse of the continuation period, if the number of remote devices to be managed remains zero until the continuation period elapses,
   wherein, when the number of remote devices to be managed becomes zero without obtaining a disconnect signal from a last removed remote device, which is a last device that has been removed from the particular network, among the one or more remote devices to be managed, the controlling step comprises continuing the operation of the wireless communication apparatus as the group owner until the continuation period elapses, and
   wherein, when the number of remote devices to be managed becomes zero while the disconnect signal is obtained from the last removed remote device, the controlling step comprises stopping the operation of the wireless communication apparatus as the group owner before the continuation period elapses.

16. The non-transitory, computer-readable storage medium according to claim 15, wherein the controlling step comprises:
   determining a holding period that begins when the first-type remote device is removed from the particular Wi-Fi Direct wireless network, each time a first-type remote device among the one or more remote devices to be managed is removed from the particular Wi-Fi Direct wireless network;
   not determining the holding period if a second-type remote device among the one or more remote devices to be managed is removed from the particular Wi-Fi Direct wireless network; and
   determining an end of the holding period that is the longest, among one or more holding periods determined in the holding period determining step, as an end of the continuation period, when the number of remote devices to be managed becomes zero,
   wherein the first-type remote device is a remote device that is removed from the particular Wi-Fi Direct wireless network without supplying a disconnect signal to the wireless communication apparatus, and
   wherein the second-type remote device is a remote device that is removed from the particular Wi-Fi Direct wireless network by supplying the disconnect signal to the wireless communication apparatus.

17. The non-transitory, computer-readable storage medium according to claim 15, wherein the controlling step comprises:
   obtaining, from each of the one or more remote devices to be managed, category data indicating a category of each of the one or more remote devices to be managed; and
   determining an end of the continuation period based on the category data obtained from the one or more remote devices to be managed.

18. The non-transitory, computer-readable storage medium according to claim 17, wherein, when the number of remote devices to be managed becomes zero, the continuation period determining step comprises determining the end of the continuation period based only on the category data obtained from a last removed remote device, which is a last device that has been removed from the particular Wi-Fi Direct wireless network among the one or more remote devices to be managed.

19. The non-transitory, computer-readable storage medium according to claim 17, wherein the continuation period determining step comprises:
referencing a memory configured to store a plurality of category data and corresponding periods, associating each of the category data with each period; and
determining the end of the continuation period based on a period associated with the category data obtained from the last removed remote device.

20. The non-transitory, computer-readable storage medium according to claim 17, wherein the controlling step comprises:
determining a holding period based on the category data obtained from the first-type remote device, each time a first-type remote device, among the one or more remote devices to be managed, is removed from the particular Wi-Fi Direct wireless network, wherein the holding period begins when the first-type remote device is removed from the particular Wi-Fi Direct wireless network; and
when the number of remote devices to be managed becomes zero, determining an end of the holding period that is the longest, among one or more holding periods determined in the holding period determining step, as an end of the continuation period.

21. The non-transitory, computer-readable storage medium according to claim 20, wherein, if a second-type remote device, among the one or more remote devices to be managed, is removed from the particular Wi-Fi Direct wireless network, the holding period is not determined in the holding period determining step,
wherein the first-type remote device is a remote device that is removed from the particular Wi-Fi Direct wireless network without supplying a disconnect signal to the wireless communication apparatus, and
wherein the second-type remote device is a remote device that is removed from the particular Wi-Fi Direct wireless network by supplying the disconnect signal to the wireless communication apparatus.

* * * * *